United States Patent Office  
3,073,802  
Patented Jan. 15, 1963

3,073,802  
POLYETHER URETHANES PREPARED IN THE PRESENCE OF STANNIC CHLORIDE  
Erwin Windemuth, Leverkusen-Bayerwerk, Hermann Schnell, Krefeld-Uerdingen, and Otto Bayer, Leverkusen-Bayerwerk, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware  
No Drawing. Filed Oct. 22, 1959, Ser. No. 847,878  
Claims priority, application Germany May 10, 1951  
1 Claim. (Cl. 260—77.5)

The present invention relates to high molecular weight polymers and to a process of producing same.

As pointed out in our co-pending application Serial No. 286,425 filed May 6, 1952, and now abandoned, of which this application is a continuation-in-part, it is known in the art to produce polyglycolethers having one or more terminal hydroxyl groups by polymerizing alkylene oxides, for instance ethylene oxide, propylene oxide, butylene oxide or the like, or by chemical addition of such alkylene oxides to mono- or polyfunctional alcohols such as stearyl alcohol, ethylene glycol, trimethylolpropane, pentaerythrite, glycerine, or the like. These polyglycolethers are generally soluble in water and organic solvents, except in aliphatic and cycloaliphatic hydrocarbons such as gasoline and cyclohexane. The molecular weight of these products varies depending on their mode of preparation.

In accordance with the invention described in the aforesaid application, we have found that polyglycolethers of a molecular weight of at least about 500 which have at least two terminal hydroxyl groups can be reacted with mono- or polyfunctional aliphatic or aromatic isocyanates. The reaction results in novel products which may be used for producing plasticizers, lubricants, plastics, spongy materials, gel formers, thickening agents, auxiliaries in textile industry, and the like. The cellular polyurethane is particularly advantageous for upholstering furniture or for use as a topper pad in a seat cushion of a vehicle.

In the above reaction, polymers or addition products of alkylene oxides of the type listed above may be used as polyglycolethers. Examples of isocyanates are the aliphatic and aromatic monoisocyanates such as chlorohexyl isocyanate, phenyl isocyanate, and the appropriate polyfunctional isocyanates such as, for example, hexamethylene diisocyanate, naphthylene-1,5-diisocyanate, toluylene diisocyanate, 4,4'-diphenylmethane diisocyanate, 1,4-phenylene diisocyanate, and 4,4'-diphenyldiisocyanate. Depending on the polyglycolether and the nature and quantity of the isocyanate used in the reaction, products are obtained which, as compared with the starting material, show modified properties and open new fields of application.

Thus, for instance, the reaction of polyglycolethers and aromatic or aliphatic monoisocyanates—depending on the molecular weight of the polyglycolether and the nature and quantity of the isocyanate—gives rise to products which are either insoluble in water, but soluble in organic solvents or which dissolve in cold water but not in hot water. The products may be used as plasticizers and lubricants, furthermore as emulsifiers if long-chain aliphatic isocyanates, for instance, stearyl isocyanate, were used for their manufacture. In some cases, especially when working with aromatic isocyanates, chemical addition of the isocyanates to the hydroxyl groups occurs with self-heating on contacting the components. It is possible in all cases to convert all the hydroxyl groups into urethane groups at higher temperatures; if volatile isocyanates are present the reaction may be carried out by application of pressure.

By reacting polyglycolethers containing two hydroxyl groups in the molecule and polyfunctional, for instance bifunctional, isocyanates, products are obtained with an increase in molecular weight, which are of resinous character or thermoplastic. Products of this type dissolve in organic solvents, except in aliphatic hydrocarbons. Products produced in the reaction of polyglycolethers of a relatively low molecular weight and diisocyanates are generally insoluble in water but soluble in organic solvents. Products derived from polyglycolethers of high molecular weight, however, dissolve in water and organic solvents. Due to their compatibility with many natural or synthetic polymeric substances and their non-volatility the products may advantageously be used as an additive for lacquers and plastics.

The reaction of polyglycolethers having three or more terminal hydroxyl groups with equivalent amounts of polyfunctional isocyanates results in cross-linked insoluble plastics. The properties of these plastics substantially depend on the starting materials used for their preparation. As a rule, hard products are obtained at room temperature when the starting materials have a high degree of cross-linkage whereas products of rubber elastic properties are obtained when the starting materials have a low degree of cross-linkage. Hard products are preferably prepared from polyglycolethers of a low molecular weight, say about 500 to 1000, whereas polyglycolethers of a high molecular weight say about 3000 to 15,000, are employed for preparing elastomers. The plastics are of interest because of their swelling properties. For instance, it is possible according to the invention to prepare rubber elastic products which are not effected at all by aliphatic hydrocarbons but swell while in contact with water.

When using polyfunctional isocyanates in quantities smaller than the equivalent ones, a partial increase only in molecular weight occurs. The isocyanate modified polyglycolethers thus obtained still contain free hydroxyl groups. Depending on the quantity of the polyisocyanate added, it is possible to prepare in this way, like in the reaction of bi-functional polyglycolethers, products which dissolve in water and organic solvents, or which are soluble in organic solvents but insoluble in water. Another possibility of variation consists in the supplementary use of aliphatic or aromatic monoisocyanates which are reacted with the residual hydroxyl groups. In the reverse order, the polyglycolethers can be partially reacted first with monoisocyanates and, thereafter, follows the reaction of the rest of the hydroxyl groups with polyfunctional isocyanates. The soluble representatives of this class of compounds may be used for a great number of applications. They are suitable for instance as thickening agents, assistants in textile industry, plasticizers for lacquers and plastics, impregnating agents for wood, and addition products in the manufacture of lead for pencils.

Products of considerable importance are obtained by reacting polyfunctional polyglycolethers and polyfunctional isocyanates in a reaction mixture containing quantities of polyisocyanate larger than that required to react with all of the hydroxyl groups of the polyglycol ether. In this way isocyanate modified polyglycolethers are obtained such as, for example, by applying twice the equivalent amount of polyfunctional isocyanates. These isocyanate modified polyglycolethers or adducts contain free isocyanate groups in the molecule and are suitable for numerous further reactions because of this high reactivity of the free —NCO groups. The reaction of the adduct or prepolymer with water may be mentioned by way of example. By causing water in the form of atmospheric moisture to act at room temperature on thin layers of isocyanate modified polyglycolethers, insoluble films or foils are obtained within a longer or shorter period, depending upon the reactivity of the isocyanate employed; the reaction of naphthylene-1,5-diisocyanate at 50 percent of relative atmospheric moisture is complete after about 2 hours. The films or foils thus obtained may have paper-like or rubber-elastic properties; they are distinguished by a remarkable swelling behavior. Complete resistance to aliphatic hydrocarbons render the new products suitable for application in those fields in the art where such property is required, for instance in the coating of gasoline tubes or storage tanks for gasoline. The capability of the new product of swelling in water can be utilized if counter-stresses are required of support materials such as paper, fabrics, and films of high polymeric plastics, to which the films or foils are applied, in contact with water or atmospheric moisture. The swelling of the layer consisting of an isocyanate modified polyglycolether on said base materials causes in many cases the material to vault to larger or lesser extent, thus compensating any counter-stresses. The aforesaid refers, for instance, to carbon paper for typewriters which by suitable treatment with the new products is prevented from being rolled up.

Isocyanate modified polyglycolethers, especially those having a molecular weight higher than 2000 and prepared from ethylene oxide are soluble in water. Solutions thus prepared, however, are not stable because of the high reactivity of the isocyanate group in water. Thickening or gel formation with the increase in molecular weight occurs within intervals of some minutes depending on the solid content of the solution. A proportion of 4 percent of an isocyanate modified polyglycolether prepared from a polyglycolether of a molecular weight of 4030 which is obtained by addition of ethylene oxide to trimethylolpropane, suffices to form a gelatinous mass. The use of smaller quantities results in the thickening of the solution.

The cross-linking by carbamide groups is accompanied with the evolution of carbon dioxide. Such course of reaction may be utilized in the manufacture of cellular materials. Isocyanate modified polyglycolethers are intimately mixed with the amount of water sufficient for reacting the excess isocyanate present, preferably in the presence of alkaline media, for instance, alkali phenolates or more preferably tertiary amines, in quantities of about 2 percent calculated on the isocyanate modified polyglycolethers, optionally with the aid of an emulsifier. The mass soon expands and solidifies to an insoluble cellular material. Of course, cellular materials can also be produced in a single step by starting with polyglycolethers which are reacted with the other components. The invention provides innumerable possibilities of variation owing to the great number of polyglycolethers and polyfunctional isocyanates which may be used as starting materials. Cellular materials of the most different physical properties may be obtained by suitable choice of the reactants. All these materials, however, are distinguished, to a larger or smaller extent, by a marked swelling capacity in water and other solvents. Reaction of isocyanate modified polyglycolethers to form insoluble products may further be carried out with aliphatic or aromatic di- or polyamines. For instance, an insoluble film or coating can be produced on a support by subjecting the isocyanate modified polyglycolether applied to the support to vapors of the above said amines, for instance, ethylene diamine. For instance, diaphragms for gasoline pumps can be produced in this manner.

The isocyanate modified polyglycolethers obtained according to the invention may further be utilized in the manufacture of compact plastics, or in other words, solid substantially non-porous rubber-like polyurethane plastics. For this purpose, glycols or polyvalent, primary or secondary, alcohols, furthermore diamines or polyvalent, primary or secondary, amines are preferably employed as cross-linking agents instead of water. In a process of this kind, the polyalkylene ether alcohol is preferably reacted with an organic polyisocyanate, preferably a diisocyanate, to form an adduct having terminal —NCO groups. An excess of organic polyisocyanate over the amount theoretically required to react with all of the hydroxyl groups of the polyalkylene ether alcohol is used. Usually the amount of organic polyisocyanates will be at least the amount required to furnish at least 1.1 —NCO groups per active hydrogen atom of the polyglycol ether. Seldom will more than 2.5 —NCO groups per active hydrogen atom be required. By "active hydrogen atoms" is meant hydrogen atoms determinable by the Zerwitinoff method. The adduct is cross-linked or chain-extended by reaction with a glycol or other polyhydric alcohol, water or amine. Examples of suitable alcohols include: ethylene glycol, diethylene glycol, glycerine, castor oil, butylene glycol, trimethylol propane, or the like, or mixtures thereof. Suitable diamines include: ethylene diamine, phenylene diamine, naphthylene diamine and the like or mixtures thereof. Because of the larger proportion of isocyanate and the different arrangement of the isocyanate in the molecular structure the physical proportions of the plastics thus prepared differ from those produced from equivalent amounts of polyfunctional isocyanates.

Furthermore, the isocyanate modified polyglycolethers are valuable intermediate products for a number of further reactions. For instance, N,N'-dialkylaminoethanols may be chemically added without difficulties thus forming basic polyglycolethers. These basic polyglycolethers may be rendered quaternary by means of halides whereby new classes of compounds are made accessible. The use of epichlorohydrin gives rise to terminal alkylene oxide groups which may be used for further reactions. Plastics of new properties can be obtained from dihalides, for instance, 1,4-dichlorobutene. By chemical addition of fatty alcohols substances having emulsifying properties are obtained. The aforesaid modifications may be named as examples of reactions which provide new classes of compounds. It is, however, by no means intended to restrict the application of isocyanate modified polyglycolethers as intermediate products.

In the reaction of polyglycolethers and polyfunctional isocyanates a too vigorous reaction and insolubilization of the reaction mixture often take place. Such course of reaction easily occurs when polyglycolethers containing free alkali from their preparation are employed. A too vigorous reaction and insolubilization are safely avoided by carrying out the reaction of polyfunctional polyglycolethers and polyfunctional isocyanates in the presence of acid reacting substances or substances which are capable of forming acid, for instance, by the action of water or heat. Very small quantities of said substances, say less than 0.5 percent, frequently only 0.05 percent calculated on the polyglycolethers, suffice to secure a uniform course of reaction. Suitable substances for this purpose are, for instance, organic and inorganic acid chlorides such as acetyl chloride, propionyl chloride, oxalyl chloride, adipic acid chloride, benzoyl chloride, phosphorus tri- and pentachloride, phosphorus oxychloride, tin tetrachloride, furthermore hydrohalic acids, inorganic acid anhydrides such as sulfur dioxide and sulfur trioxide. Reference may further be made to butadiene sulfone which decomposes into butadiene and sulfur dioxide at higher temperatures. The action of the aforesaid substances is shown in various directions:

(1) they prevent the polymerization of the isocyanate group;

(2) they exert a retarding influence on the speed of reaction between the isocyanate groups and the hydroxyl groups of polyglycolethers;

(3) the polymerization inhibiting action on the isocyanate groups is preserved in the end or intermediate product, even after completion of the reaction.

The latter point is of importance in respect of the storing capacity of the isocyanate modified polyglycolethers which can be easily handled provided that atmospheric moisture is excluded.

In those cases where the acid substances which inhibit polymerization and retard reaction velocity will interfere in the further reactions, the action of the said substances can be compensated at any time by addition of alkaline agents, for instance, tertiary amines. These alkaline agents may either be incorporated into the isocyanate modified polyglycolethers or may be caused to act on the isocyanate modified polyglycolethers from outside, for instance in the form of gases. For instance, if on a support a film or foil is to be produced from a stabilized isocyanate modified polyglycolether the reaction with the atmospheric moisture can be substantially accelerated by contacting the isocyanate modified polyglycolether applied to the support with a gaseous atmosphere, for instance, such containing vapors of hexahydrodimethylaniline.

It is advantageous to include an acidic material or acid engendering substance in the reaction mixture which produces either the porous or non-porous polyglycol ether polyurethane. Several examples of suitable acid engendering substances have been listed. It has now been found that best results are obtained when this acid engendering substance is a substance containing divalent or tetravalent tin such as, for example, tin tetrachloride or in other words stannic chloride. Tetravalent tin compounds which under the reaction conditions engender an acid are particularly advantageous as an ingredient in a reaction mixture containing a polyglycol ether and which will produce a cellular or porous polyurethane plastic. As indicated by the disclosure that tin tetrachloride is a suitable acid engendering substance, the tin compound may be an inorganic compound or it may be an organic tin compound but it must be soluble in the reaction mixture containing the chain-extender. Indeed any substance which contains tin in the divalent or tetravalent state and which is soluble in the reaction mixture under the reaction conditions utilized to prepare a polyglycol ether polyurethane plastic may be used to advantage. Examples of some of the compounds which are preferred include alkyl or aryl tin trihalogenides such as n-butyl tin trichloride, phenyl tin trichloride; dialkyl- or diaryl tin dihalogenides such as di-n-butyl tin dichloride, dibenzyl tin dichloride, dilauryl tin dichloride, dioctyl tin dichloride, diethyl tin bromide, diphenyl tin dibromide, di-$\beta$-chlorovinyl tin dichloride; trialkyl or triaryl tin halogenides such as triethyl tin chloride, trimethyl tin bromide, tri-n-propyl tin chloride, triphenyl tin chloride, tri-n-butyl tin chloride, tri-n-pentyl bromide, tri-p-chlorophenyl tin bromide. Other suitable acid engendering substances containing tin include stannous chloride, and tin salts of organic acids having up to 18 carbon atoms such as stannous acetate, stannous oleate, dibutyl tin dilaurate, di-propyl tin dilaurate, dibutyl tin diacetate, dibutyl dioleate, dimethyl tin diacetate, dibutyl tin di-(2-ethyl hexoate), diethyl-n-hexyl tin acetate, diethyl-n-butyl tin acetate, dimethyl-n-butyl tin acetate, dimethyl-n-octyl tin acetate, diethyl phenyl tin acetate, triphenyl tin acetate, triethyl tin acetate, tri-p-chlorophenyl tin acetate, diethyl-p-bromophenyl tin acetate, triethyl tin caproate, triethyl tin laurate, triethyl tin benzoate.

Best results are obtained, particularly when all of the components which react to form the polyurethane are mixed together at substantially the same time, when both an acid engendering compound containing tin and a tertiary amine catalyst are used. Any suitable tertiary amine catalyst may be used such as, for example, N-ethyl morpholine, N-methyl morpohline, triethylene diamine, one of those mentioned hereinbefore, or the like. By including both a tertiary amine in catalytic amounts and a catalytic amount of the acid engendering tin compound in the reaction mixture it is possible to produce a cellular polyglycolether polyurethane having good physical characteristics and of substantially uniform structure and composition even when the polyglycol ether, polyisocyanate, catalyst and acid engendering tin compound are all mixed together at one time thus avoiding the necessity of preparing under substantially anhydrous conditions an —NCO terminated prepolymer or adduct in a first step and then adding water in a second step to form the cellular product. The one-step process is preferred over the prepolymer process because it is simpler and results in greater uniformity of product over a given period of production.

The term "polyglycol ether" is used herein with respect to compounds having two or more hydroxyl groups such as, for example, a dihydric polyalkylene ether prepared by condensing an alkylene oxide or a trihydric polyalkylene ether prepared by condensing an alkylene oxide and glycerine. Possibly, a more apt expression is polyhydric polyalkylene ether.

The invention is further illustrated in the aforesaid copending application by the following examples without being restricted thereto, the parts being by weight.

*Example 1*

50 parts of a polyglycolether obtained by chemical addition of 8.5 mols of ethylene oxide to 1 mol of trimethylol propane are reacted with 16.8 parts of hexamethylene diisocyanate at 120° C. for two hours. The melt becomes viscous. A light yellow resin is obtained on cooling which is insoluble in hot and cold water and forms viscous solutions in acetone, benzene, chloroform, and ethyl acetate. The resin may be used as addition agent for lacquers and plastics, for instance those prepared on the basis of nitrocellulose.

*Example 2*

300 parts of a polyglycolether obtained by addition of 9.5 mols of ethylene oxide to 1 mol of trimethylol propane are reacted with 196 parts of phenyl isocyanate. After completion of the exothermic reaction the mixture is stirred at 150° C. for one hour. The resultant viscous oil (481 parts) is insoluble in water but dissolves in organic solvents. The oil is not volatile and compatible with nitrocellulose, cellulose acetobutyrate, cellulose triacetate, benzyl cellulose, polyvinyl acetate, copolymers of vinyl choride, and polyvinyl acetate, and may successfully be employed for plasticizing said substances. The reaction product has a flash point of 249° C., the point of ignition is 284° C. The product shows good lubricating properties.

*Example 3*

300 parts of the polyglycolether described in Example 2 are reacted with 266 parts of 6-chlorohexylisocyanate at 120–150° C. until a homogeneous melt has formed which is stirred at 150° C. for another hour. The excess isocyanate is removed in vacuo by heating. 540 parts of an oil of mean viscosity is obtained which is insoluble in water but soluble in organic solvents. The oil is not volatile and compatible with nitrocellulose, cellulose acetobutyrate, cellulose triacetate, benzyl cellulose, chlorinated rubber, polyvinylacetate, copolymers of polyvinylchloride, and polyvinylacetate, and may successfully be employed for plasticizing said products. Furthermore, the oil has good lubricating properties.

*Example 4*

50 parts of a polyglycolether obtained by addition of 9 mols of ethylene oxide to 1 mol of trimethylol propane are reacted with 34 parts of stearyl isocyanate at 140° C. for 4 hours. The resultant paste forms turbid suspensions in cold water and is insoluble in hot water. The substance may be employed for emulsifying for instance fats, oils, and hydrocarbons in water.

*Example 5*

Polymeric products of varying solubility properties can be obtained by reacting a polyglycolether prepared from trimethylol propane and ethylene oxide, which has the molecular weight 4030, with hexamethylene diisocyanate. The process of preparing said polymeric product is carried out as follows: 100 parts of the polyglycolether are dehydrated at 150° C. and 1 mm. Hg by treatment in vacuo for one hour, thereupon cooled to 45° C. and 0.25 percent of acetyl chloride is added. 15 minutes after addition of acetyl chloride, hexamethylene diisocyanate is introduced into the melt which is constantly stirred and simultaneously heated to 80° C. After thoroughly mixing the reactants which generally takes about 10 minutes, the mixture is poured into a vessel which may be closed and the reaction is completed in the vessel by heating to 80° C. for 6 hours. The products listed in the following table are obtained by the reaction:

| Product No | Grams of hexamethylene diisocyanate per 100 grams of polyglycolether | Viscosity No $\eta$ solvents, water | Solubility water | Solubility methanol |
|---|---|---|---|---|
| 1 | 3.6 | 33.9 | soluble | Soluble |
| 2 | 3.7 | 38.2 | do | Do |
| 3 | 3.8 | 51 | do | Do |
| 4 | 3.9 | | insoluble in cold, soluble in warm or hot water insoluble. | Do |
| 5 | 4.0 | | | Do |
| 6 | 4.1 | | | Do |
| 7 | 4.2 | | | Do |
| 8 | 4.4 | | | Insoluble |

All the above isocyanate modified resins are highly viscous, fibre forming masses in the heat; they are tough at room temperature and show a conchoidal structure. Like the polyglycolether used for their preparation all the products are distinguished by complete insolubility in aliphatic hydrocarbons. The aqueous solutions of the products may be employed as textile assistants and for impregnating wood, especially in the preparation of pencils. Furthermore, the products may successfully be used in the preparation of lead for pencils and as plasticizers for plastics and lacquers.

*Example 6*

The wax of the molecular weight 4030, which is prepared from trimethylol propane and ethylene oxide, is dehydrated as described in Example 5 and acetyl chloride is added. The wax is then mixed with toluylene diisocyanate (6.48 parts per 100 parts of wax), the mixture is cast into a mold wherein the raction is completed by heating for 6 hours to 100° C. A cross-linked plastic is obtained which is insoluble in water and organic solvents and shows rubber-elastic properties, especially at temperatures above the softening point of the resin used (48° C.). The product is of importance because of its incapability of swelling in aliphatic hydrocarbons and its swelling capacity in water. The use of 7.82 parts of naphthalene-1.5-diisocyanate, or of 6.25 parts of hexamethylene diisocyanate per 100 parts of wax results in the formation of similar cross-linked plastics. It is thus possible to produce shaped articles by casting.

*Example 7*

100 parts of a polyglycolether prepared from trimethylol propane and ethylene oxide, which has a molecular weight of 4030, are reacted with 16.9 parts of naphthalene-1,5-diisocyanate after dehydration and addition of acetyl chloride as described in Example 5. In order to ensure a homogeneous melt the isocyanate is added at a temperature of 125–130° C. and after fusing the isocyanate the melt is heated to 80–100° C. for a further two hours while continuously stirring. The product obtained by the reaction is an isocyanate modified polyglycolether having three reactive isocyanate groups per one mol of polyglycolether. By applying this product in a thin layer from a 75 percent acetone solution to a glass plate, a rubber-elastic film which may be removed from the support is obtained after stirring at room temperature for one and a half to two hours. The film shows remarkable swelling properties which are determined by means of 0.25 mm. thick lamellae of an area of 9 cm.² by swelling at room temperature in the most various solvents which are listed in the table below. As measure for the swelling degree the quotient of the area of the swelled lamella (F) and the area of the lamella prior to swelling ($F_0$) is given in the table.

| Solvents | Swelling Quotient $F/F_0$ | |
|---|---|---|
| | Film of polyglycolether, molecular weight 4030, + 16.9 parts by weight of naphthylene-1,5-diisocyanate per 100 grams of polymer | Film of polyglycolether, molecular weight 8950, + 9.4 parts by weight of naphthylene diisocyanate per 100 grams of polymer |
| Water | 2.05 | 2.90 |
| Ethanol | 1.48 | 1.11 |
| Methanol | 1.69 | 2.36 |
| Acetone | 1.65 | 2.20 |
| Diethyl ether | 1.17 | 1.03 |
| Tetrachloride carbon | 1.48 | 1.20 |
| Methylene chloride | 3.00 | 4.12 |
| Dimethyl formamide | 2.67 | |
| Benzene | 1.82 | 2.71 |
| Gasoline | 1.03 | 1.00 |
| Cyclohexane | | 1.00 |

Foils showing similar swelling properties may be obtained from the aforesaid polyglycolether and 13 parts of toluylene diisocyanate per 100 parts of wax. The reaction of such diisocyanate modified polyglycolether and atmospheric moisture is preferably carried out at moderately elevated temperatures, for instance at 50° C., since this isocyanate modified polyglycolether crystallizes at room temperatures thus causing the formation of films with rough surfaces. This crystallinity is still more noticeable with isocyanate modified polyglycolether of higher molecular weight, for instance such obtained by reacting a polyglycolether of the molecular weight 8950, which is prepared from pentaerythrite and ethylene oxide, with 9.4 parts of naphthylene-1,5-diisocyanate per 100 parts of wax. The films produced from the latter type isocyanate modified polyglycolethers have more noticeable swelling properties (see table), however, without showing principle differences from the above described product produced by means of 60.9 parts of naphthalene-1.5-diisocyanate.

*Example 8*

100 parts of a polyglycolether of the molecular weight 4030, prepared by addition of ethylene oxide to trimethylol propane, are reacted with 0.5 percent of butadiene sulfone at 150° C. and 1 mm. Hg after dehydration for one hour. The major part of the butadiene sulfone has decomposed after 30 minutes. To remove volatile ingredients vacuum treatment is repeated for a short time until the melt is free of bubbles. Thereupon 14 parts of toluylene diisocyanate are added while continuously stirring at 80° C. and the reaction is completed by heating the melt at the same temperature for another hour. An isocyanate modified polyglycolether containing 3.2 percent of —NCO groups is thus obtained. The product is stable provided that atmospheric moisture is completely excluded. Crystallization occurs at room temperature; the product is liquid at moderately elevated temperatures. The free —NCO groups render the isocyanate modified polyglycolether suitable for use as an intermediate product in further reactions. The reaction of the product in thin layers with atmospheric moisture to form rubber-elastic films has been described in Example 7. Other effects are attained by stirring the product into water. For this purpose, a solution of the isocyanate in acetone or tetrahydrofuran is preferably employed. Presently after preparation of the aqueous solution the latter solidifies to an insoluble gel. The solidity of the gel increases with the quantity of the isocyanate modified polyglycolether used.

When 4 percent of diisocyanate modified polyglycolether are employed a solid oil is obtained whereas 3 percent of diisocyanate modified polyglycolether cause the formation of a thickly viscous liquid. Gel formation is accompanied with the evolution of carbon dioxide which can be perceived by the formation of bubbles in the gel, especially when larger quantities of the isocyanate are used. The reaction can advantageously be adapted to the thickening of aqueous solutions or emulsions.

*Example 9*

The isocyanate modified polyglycolether obtained according to Example 8, which contains 3.2 percent of

—NCO groups, can successfully be employed in the manufacture of plastics. 100 parts of this isocyanate modified polyglycolether are reacted with 6.8 parts of dimethyl amine ethanol at 80° C. A polyglycolether containing terminal, tertiary nitrogen atoms is thus obtained. By mixing this basic intermediate product with 5 percent of 1.4-dichlorobutene a cross-linked, insoluble plastic is obtained in an exothermic reaction.

*Example 10*

100 parts of the isocyanate modified polyglycolether obtained according to Example 8, which contains 3.2 percent of —NCO groups, is mixed with 2 percent of water and 2 percent of the product prepared by addition of phenyl isocyanate to N,N'-dimethyl amino ethanol at moderately elevated temperatures at which the product is present in a liquid form. The mass begins to expand by the action of carbon dioxide evolved from the free —NCO groups and water, and eventually solidifies to an elastic cellular product. The product has the remarkable property of swelling in water to a material extent whereby an increase in molecular weight by 4 times the weight of the starting material was determined. After drying the swelled sponge the starting material is recovered.

*Example 11*

100 parts of an ethylene oxide polymer having the hydroxyl number 11.0 are dehydrated at 150° C. and 1 mm. Hg for one hour and intimately mixed after cooling to 80° C. and hexamethylene diisocyanate in quantities indicated in the table below. The mixture, which becomes distinctly more viscous already after 10 minutes, is filled into a container wherein the reaction is completed by heating to 80° C. for 8 hours. Products of high molecular weight which have higher viscosity numbers than the starting materials are obtained. All the products are soluble in water.

| Test No. | Grams of hexamethylene diisocyanate per 100 grams of ethylene oxide polymer | Viscosity number $z_\eta$ measured in water as solvent |
| --- | --- | --- |
| Untreated polymer | | 17 |
| 1 | 1.5 | 32.9 |
| 2 | 2.0 | 40.9 |

*Example 12*

250 parts of a polyglycolether of the hydroxyl number 58.0, which has been obtained by addition of ethylene oxide to pentaerythrite, are reacted with 0.725 part of acetyl chloride and thereafter with 40 parts of toluylene diisocyanate after dehydration by heating in vacuo at 50° C. The reaction is complete after 1 hour's stirring at 80° C. The resultant isocyanate modified polyglycolether contains 3.53 percent of —NCO groups. The product shows the same properties, for instance in water, as the diisocyanate modified polyglycolether described in Example 8.

In our co-pending application 626,585, of which this application is a continuation-in-part, the disclosure of which is incorporated therein by reference, we described a process for making cellular polyurethane. In accordance with that process a polyhydric polyalkylene ether having a molecular weight of at least about 500 is reacted with an excess of organic polyisocyanate and water to form a cellular polyurethane. Carbon dioxide is formed through reaction of —NCO groups and water and becomes entrapped in the thickening reaction mixture. Upon solidification the resinous product has a porous structure and is known as a urethane foam. The polyhydric polyalkylene ether, polyisocyanate and water may be mixed together substantially simultaneously or the polyhydric polyalkylene ether may be reacted under substantially anhydrous conditions in a first step with an excess of the polyisocyanate to form a prepolymer having terminal —NCO groups which is later reacted with water to form the cellular polyurethane.

In preparing a cellular polyurethane it is preferred to use from about 1 to about 5 percent by weight of water based on the weight of polyhydric polyalkylene ether used. Preferably, from about 35 to about 55 parts by weight polyisocyanate is used to about 100 parts polyhydric polyalkylene ether. Preferably, the hydroxyl number of the polyhydric polyalkylene ether should be not substantially more than about 225 and usually it will fall within the range of from about 50 to about 70. It is preferred to use a mixture of a compound containing tin of the type described herein and a tertiary amine in making foam. It is to be understood that the invention contemplates broadly the use of any acid engendering substance and any tertiary amine and is not limited to the specific compounds listed herein.

A polyurethane can be prepared by following the manipulative steps set forth in U.S. Reissue Patent 24,514 and by using the apparatus disclosed in that patent or any other suitable mixing apparatus.

The following examples are illustrative of additional embodiments of producing polyurethanes in accordance with this invention using a catalyst containing tin.

*Example 13*

To 1000 parts by weight of a polypropylene ether trimethylol propane having a hydroxyl number of 330 and being prepared by condensation of propylene oxide with trimethylol propane are added dropwise 11 parts by weight of tin tetrachloride. A small precipitate is separated by filtration from the liquid phase.

100 parts by weight of the tin tetrachloride containing polypropylene glycol ether, 135 parts by weight of 4,4'-diphenyl methane diisocyanate (28.8% NCO), 4 parts by weight of a 50% aqueous solution of the sodium salt of sulphated ricinoleic acid, 4 parts by weight of permethylated diethylene triamine and 2 parts by weight of paraffin oil are mixed together substantially simultaneously with an apparatus of the type disclosed in the U.S. Patent 2,764,565. All of the components are substantially uniformly mixed together substantially instantaneously in this apparatus by injecting the (1) organic diisocyanate and (2) catalyst mixture as separate streams into the polyalkylene ether alcohol being continuously fed into the mixing chamber of the apparatus. The resulting mixture is continuously discharged from the apparatus before any substantial amount of chemical reaction between the components has proceded. Chemical reaction procedes after discharge of the reaction mixture with an accompanying expansion and foaming of the mixture into a cellular product which solidifies to form a rigid cellular polyurethane plastic having a uniform pore structure and a density of about 55 kg./m.³

*Example 14*

800 parts by weight of a linear polypropylene glycol ether (hydroxyl number 150) are dehydrated in vacuo of 14 mm. Hg for one hour at 100° C. 8 parts by weight of dibutyl tin dichloride are added at 40° C. 100 parts by weight of the clear mixture of polypropylene glycol ether and dibutyl tin dichloride are intimately mixed following the procedure of Example 13 with 70 parts by weight of 4,4'-diphenyl methane diisocyanate (28.8% NCO), 2 parts by weight of a 50% aqueous solution of the sodium salt of sulphated ricinoleic acid, 1 part by weight of permethylated diethylene triamine, 1 part by weight of dimethyl-(3-ethoxy propyl)-amine, and 3 parts by weight of 17.5% potassium hydroxide solution in benzyl alcohol and methanol (3:1). Chemical reaction proceeds after discharge of the reaction mixture from the mixing apparatus and results in a semi-rigid foam having a uniform pore structure and a density of 109 kg./m.$^3$. The foam is highly suitable as damping material for moderating impact stresses.

*Example 15*

800 parts by weight of the addition product of propylene oxide to trimethylol propane (hydroxyl number 330) are dehydrated in vacuo of 14 mm. Hg at 100° C. 4 parts of dibutyl tin dichloride are added. A milky solution is obtained.

100 parts by weight of the milky solution are intimately mixed in an apparatus as described in Example 13 with 4 parts by weight of a 50% aqueous solution of the sodium salt of sulphated ricinoleic acid, 1 part by weight of dimethyl-(3-ethoxy propyl)-amine and 85 parts by weight of 2.4- and 2.6-toluylene diisocyanate (isomer ratio 65:35). The mixture starts foaming at once and solidifies to a rigid foam of uniform pore structure. Density 24 kg./m.$^3$.

If dibutyl tin dichloride is omitted from the foam formulation, a large amount of carbon dioxide evolves from the reaction mixture without blowing the reaction mass. A rigid foam is obtained with an irregular pore structure. The core of the foam is brown colored in contrast to the foam obtained as above which has a purely white core. Density 32 kg./m.$^3$.

*Example 16*

To 400 parts of an ethylene oxide adduct to trimethylol propane (hydroxyl number 258, molecular weight 650) are added 4 parts of dibutyl tin dichloride. 100 parts by weight of this mixture are intimately mixed with 3 parts by weight of a 50% aqueous solution of the sodium salt of sulphated ricinoleic acid, 1 part by weight of dimethyl-(3-ethoxy propyl)-amine and 60 parts by weight of 2.4- and 2.6-toluylene diisocyanate (isomer mixture 65:35). The uniform mixture of the components expands after being discharged from the mixing apparatus and solidifies to a semi-rigid white foam with uniform pore structure.

If the dibutyl tin dichloride is omitted from the foam formulation, a foam is obtained which needs a longer time for solidification. It has a yellow color and tends to shrinking.

*Example 17*

600 parts by weight of an adduct of propylene oxide to trimethylol propane (hydroxyl number 56) are admixed after dehydration at 60° C. with 3 parts by weight of dibutyl tin dilaurate and 104 parts by weight of 2.4- and 2.6-toluylene diisocyanate (isomer ratio 65:35). In an exothermic reaction which is smoothed by cooling that the reaction temperature does not exceed 80° C., a prepolymer is formed within 15 minutes having an NCO content of 3.5%. The prepolymer is mixed with 127 parts by weight of toluylene diisocyanate. The NCO content of the mixture is 9.6%, viscosity 12300 cp./25° C.

200 parts by weight of the prepolymer mixture are intimately mixed with 2 parts by weight of water, 4 parts by weight of 1-methyl-2-coco alkyl tetrahydropyrimidine and 4 parts by weight of a polyethylene glycol ether of benzyl-p-oxy diphenyl. The reaction mixture is continuously discharged from the mixing apparatus. Chemical reaction starts at once with accompanying expansion and foaming of the mixture into an elastic cellular product, the surface of which being tacky-free within 10 minutes.

If from the same starting materials but omitting the dibutyl tin dilaurate a prepolymer is made (NCO content 10%, viscosity 6410 cp./25° C.) and foamed, the resulting foam solidifies only after a longer period. Its surface is still tacky even after two hours. The foam has a yellow color.

*Example 18*

To 500 parts by weight of an adduct of propylene oxide to trimethylol propane (hydroxyl number 330) are added 11 parts by weight of stannous chloride (dehydrate). After dissolution of the salt at 80° C. the polyether is dehydrated in vacuo at 80° C. and filtered. The clear filtrate shows an acid number of 19. 100 parts of the filtrate are mixed with 2 parts by weight of dimethyl triethoxy propyl amine, 1 part by weight of a polyethylene glycol ether of benzyl-p-oxydiphenyl, and 80 parts by weight of 2.4- and 2.6-toluylene diisocyanate (isomer ratio 65:35). Chemical reaction starts at once after discharge of the reaction mixture from the mixing apparatus and results in a rigid cellular product having a density of 75 kg./m.$^3$.

It is to be understood that any other polyhydric polyalkylene ether or organic polyisocyanate may be used in lieu of those set forth in the foregoing examples. Likewise, another catalyst containing tin compound is used. Other tertiary amines can be used in conjunction with the tin catalyst to form the preferred embodiment of the invention.

Although the invention has been described in considerable detail for the purpose of illustration, it is to be understood that variations may be made therein by those skilled in the art without departing from the spirit of the invention and the scope of the claim.

What is claimed is:

In the preparation of a polyurethane by a process which comprises reacting a polyhydric polyalkylene ether and an organic polyisocyanate, the improvement which comprises effecting the said reaction in the presence of stannic chloride.

References Cited in the file of this patent

FOREIGN PATENTS 779,806 Great Britain _____ Dec. 18, 1952
860,109 Germany _____ July 24, 1957

OTHER REFERENCES

Mobay Publication, "A One Shot System For Flexible Polyether-Urethane Foams," Nov. 10, 1958.
Union Carbide Publication, Bulletin F–4087, February 1959.
Mobay Technical Information Bulletin, No. 28–F9; July 20, 1959, Mobay Chem. Co., Pittsburgh 34, Pa.
Mobay Technical Information Bulletin, No. 17–F6; Apr. 3, 1959, Mobay Chem. Co., Pittsburgh 34, Pa.

UNITED STATES PATENT OFFICE
CERTIFICATE OF CORRECTION

January 15, 1963

Patent No. 3,073,802

Erwin Windemuth et al.

It is hereby certified that error appears in the above numbered patent requiring correction and that the said Letters Patent should read as corrected below.

Column 1, line 18, for ", and now abandoned" read -- , now U. S. Patent No. 2,948,691 --; column 7, line 49, for "raction" read -- reaction --; column 9, line 44, for "and" -- with --.

Signed and sealed this 10th day of December 1963.

(SEAL)
Attest:

ERNEST W. SWIDER

Attesting Officer

EDWIN L. REYNOLDS

Acting Commissioner of Patents